March 10, 1959
H. W. DICKINSON
2,876,451
MECHANISM FOR MANUFACTURING RAFTERS
Filed Sept. 23, 1957
3 Sheets-Sheet 1
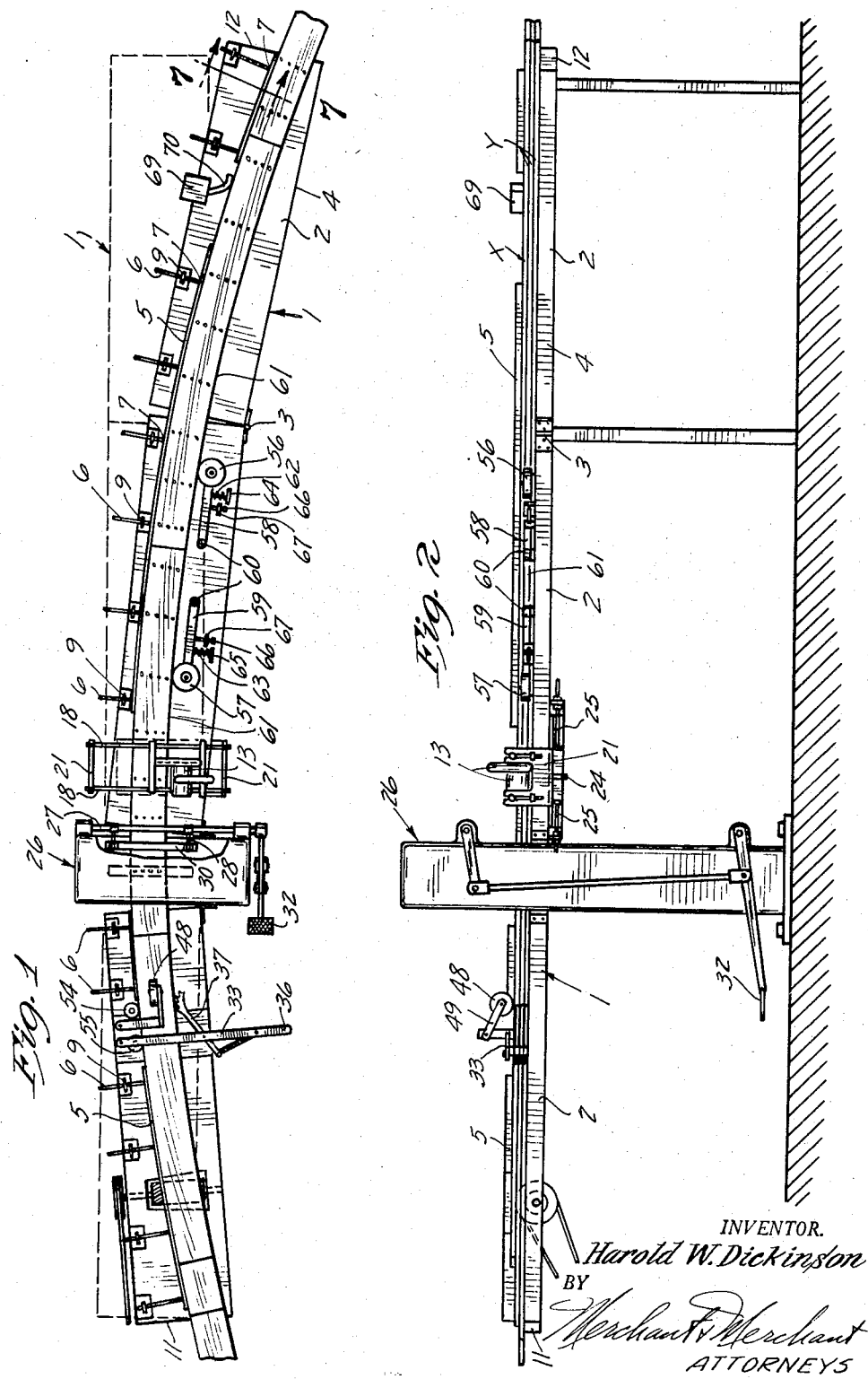
INVENTOR.
Harold W. Dickinson
BY
Merchant & Merchant
ATTORNEYS March 10, 1959  H. W. DICKINSON  2,876,451
MECHANISM FOR MANUFACTURING RAFTERS
Filed Sept. 23, 1957  3 Sheets-Sheet 2
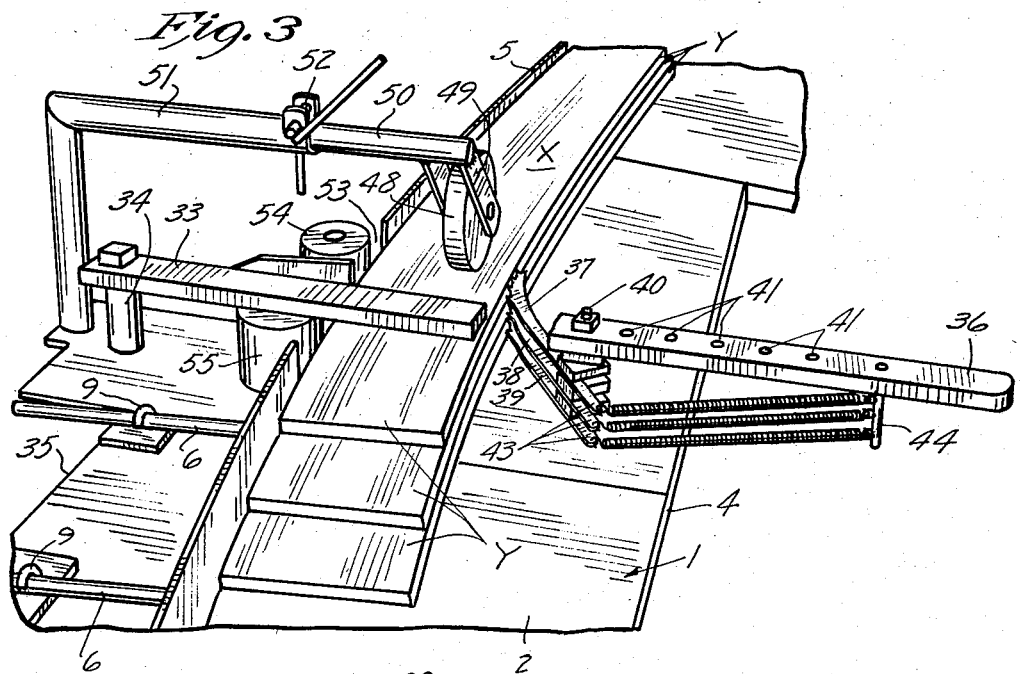
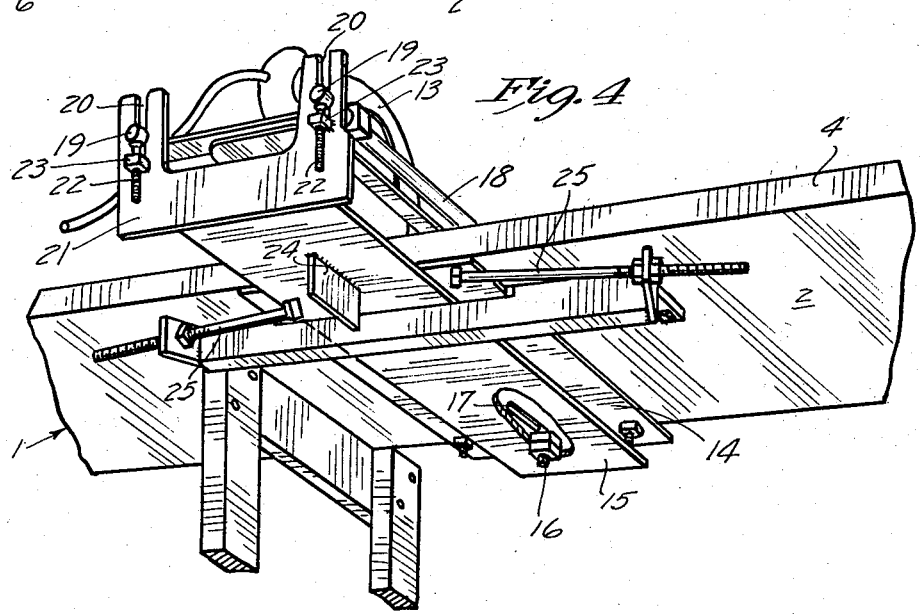
INVENTOR.
Harold W. Dickinson
BY
Merchant & Merchant
ATTORNEYS March 10, 1959     H. W. DICKINSON     2,876,451
MECHANISM FOR MANUFACTURING RAFTERS
Filed Sept. 23, 1957     3 Sheets-Sheet 3
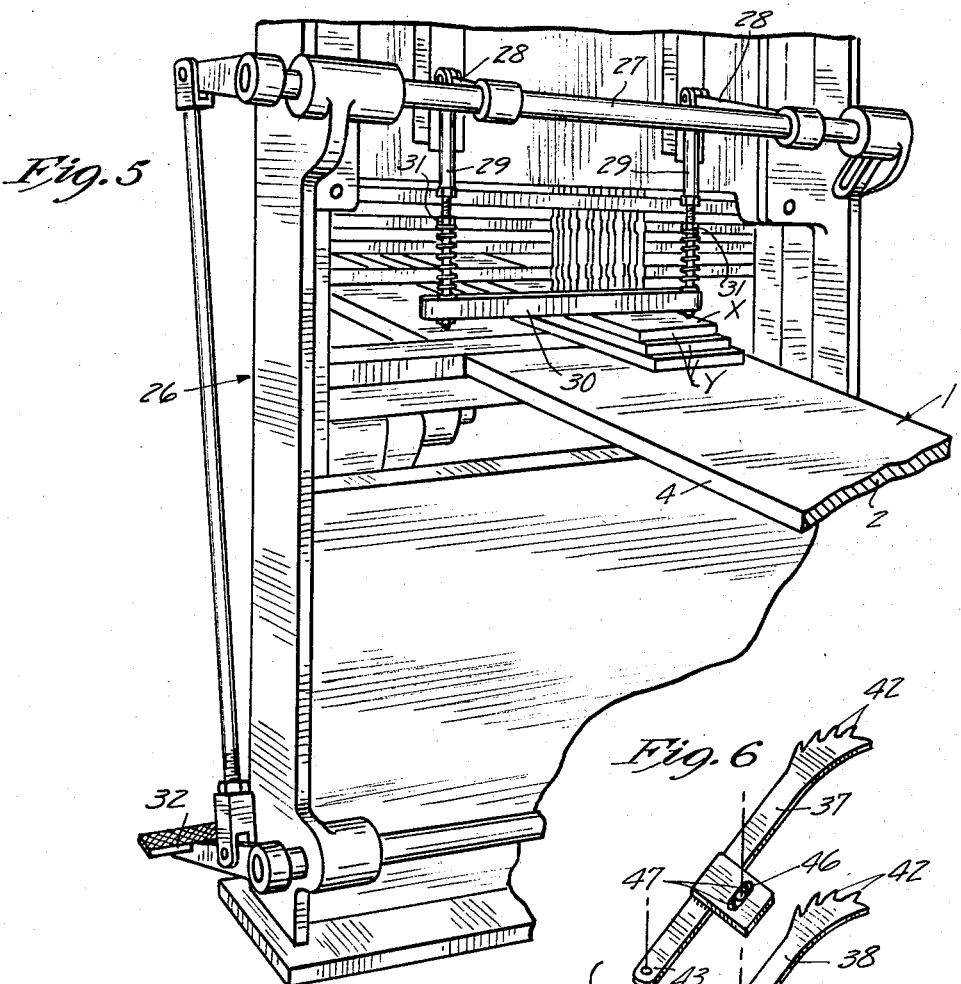
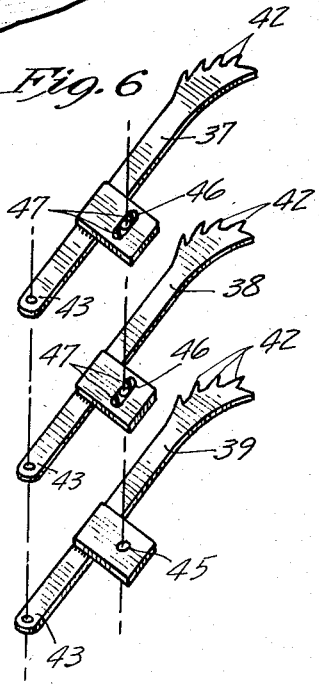
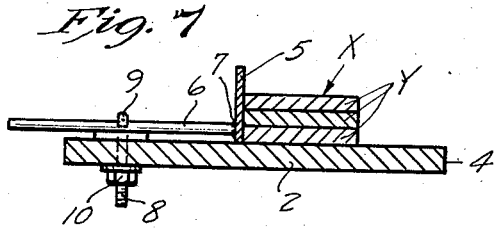
INVENTOR.
Harold W. Dickinson
BY
Merchant & Merchant
ATTORNEYS

United States Patent Office 2,876,451
Patented Mar. 10, 1959

2,876,451

MECHANISM FOR MANUFACTURING RAFTERS

Harold W. Dickinson, Olivia, Minn.

Application September 23, 1957, Serial No. 685,656

5 Claims. (Cl. 1—148)

My invention relates to devices for continuously forming laminated rafters and the like and has for its primary object the provision of a device of the class described which may be readily adjusted so as to optionally produce straight or arcuate laminated rafters.

A still further object of my invention is the provision of a device of the class described which is capable of continuously producing laminated rafters of varying arcs or curvatures, for use in buildings of varying shapes and sizes.

A still further object of my invention is the provision of a device of the class immediately above described which is provided with a power saw mounted for sliding movements generally transversely of the path of travel of the rafter being formed thereon, the angle of the path of travel of said saw being adjustable, whereby the rafter sections produced on my novel device may be cut off at the desired angle which a given situation requires.

A still further object of my invention is the provision of a device of the class described which is relatively inexpensive to produce, which may be operated extremely efficiently with a minimum of labor and which is capable of producing straight or curved laminated rafters of great uniformity and strength.

The above and still further objects of my invention will become apparent from the following detailed specification, appended claims, and attached drawings.

Referring to the drawings, wherein like parts are indicated by like characters throughout the several views:

Fig. 1 is a view in top plan of my novel structure, some parts being broken away;

Fig. 2 is a view in side elevation of the structure of Fig. 1;

Fig. 3 is an enlarged fragmentary perspective view showing the rafter advancing and hold-down means;

Fig. 4 is an enlarged fragmentary perspective view of the sawing mechanism of my device, as seen from below same.

Fig. 5 is an enlarged fragmentary view in perspective of the hold-down structure of my device;

Fig. 6 is an enlarged exploded view in perspective of a part of the rafter advancing means shown in Fig. 3; and Fig. 7 is an enlarged view in transverse section as seen substantially from the line 7—7 of Fig. 1.

Referring with greater particularity to the drawings, the numeral 1 indicates in its entirety an elongated horizontally disposed table, preferably and as shown comprising a plurality of elongated table sections 2 which are hinged together on vertical axes by means of hinges 3, along the longitudinal side edge 4. As shown in Fig. 1, the table 1 is capable of assuming the longitudinally aligned position indicated by dotted lines or the generally arcuate condition illustrated therein by full lines.

Mounted on the table 1 and extending generally longitudinally thereof is an upstanding flexible guide 5 which is interrupted at longitudinally spaced points, for purposes which will hereinafter be explained in detail. Guide 5 may be formed from sheet steel or the like of a thin enough gauge to permit flexing thereof but yet strong enough to withstand the operative forces exerted thereon, once it has been caused to assume a given position. The means for shifting said guide 5 laterally with respect to the table 1, whereby to move same from a straight to a desired arcuate position, or alternatively, to vary the arc thereof, comprises a plurality of longitudinally spaced laterally outwardly projecting anchoring rods 6, the inner ends of which are rigidly secured, by welding or other suitable means, to the back side of the guide 5, as indicated by the numeral 7. As shown particularly in Figs. 1, 3 and 7, nut-equipped bolts 8 project slidably through the table 1 at longitudinally spaced points, the hook acting upper ends 9 of one each thereof overlying the intermediate portions of one of the anchoring rods 6. It will be noted by reference particularly to Fig. 1 that the anchoring rods 6, particularly those adjacent the opposite ends of the table 1, are of a length to permit sliding movements of the guide 5 (when the nut 10 is loosened), to any desired reasonable extent to create the desired arc. Obviously, tightening of the nuts 10 positively anchors the guide 5 at longitudinally spaced points whereby to maintain the desired arc.

Mounted on the table 1 intermediate the front end 11 and the rear end 12 thereof, is a power saw 13 of conventional design. The mounting means for the saw 13 includes a transverse base plate 14 rigidly secured to the under side of one of the table sections 2 and a transversely extended mounting plate 15 underlying the base plate 14 and pivotally secured thereto adjacent one end, by means of an adjustable pivot pin 16. As shown, particularly by Fig. 4, the base plate 14 is longitudinally slotted, as indicated at 17, whereas the mounting plate 15 contains an aperture not specifically shown, for the snug reception of the pivot pin 16. A spacer element, not shown, is interposed between the base plate 14 and the mounting plate 15, concentric with pivot pin 16. This arrangement permits of longitudinal adjustments of the mounting plate 15, transversely of the table 1, to compensate for the cutting of rafters of varying depths as rafter sawing movements are imparted to the saw 13 on the slide rods 18 upon which it is mounted. It will be noted that the opposite end portions 19 of the slide rods 18 are received within open ended slots 20 in the bracket plates 21, and that vertical adjustments may be imparted thereto by means of threaded bolts 22 working through lugs 23. Pivotal movements in opposite directions of the mounting plate 15 and power saw 13 carried thereby, to vary the angle of the path of travel of the saw 13 generally transversely of the table 1, are limited by means of a vertical stop plate 24 rigidly secured to the bottom of the mounting plate 15 and depending therefrom, adjacent the side edge 4 of the table 1. Stop plate 24 works between a pair of lugs 25, shown as being in the nature of adjustable bolts. It will be observed that the stop plate 24 has sufficient longitudinal dimension to engage the lugs 25 in all longitudinal adjustments of the mounting plate 15 with respect to the base plate 14.

In forwardly spaced relationship to the power saw 13 is a combination lamination compressing and nailing device of conventional design, identified in its entirety by the numeral 26, and including a horizontally disposed rockshaft 27 overlying the path of travel of a rafter X. Rigidly secured to the rockshaft 27 for pivotal movements therewith are a pair of rocker arms 28 the outer ends of which are pivotally secured one each to a leg 29. Connecting the lower ends of the legs 29 is a horizontally disposed compression bar 30 which is yieldingly biased toward its lowermost position by means of coil springs encompassing the lower portions of the legs 29 and interposed therebetween and adjustment nuts 31. A treadle 32 is provided for imparting rocking movements to the rockshaft 27. The details of the mechanism within the device 26 for nailing together the several laminations Y comprising the rafter X, form no part of the instant invention and hence are not illustrated.

Means for imparting advancing movements to the rafter X as it passes from the front end 11 to the rear end 12 of the table 1 comprises a horizontally disposed lever 33 forwardly spaced (with respect to the path of travel of a rafter X through my device) from the nailing and compressing device 26. One end of lever 33 is pivotally secured on a vertical axis 34 to the table 1 adjacent the longitudinal side edge 35 thereof. As shown particularly in Fig. 3, lever 33 overlies the path of travel of the rafter X and terminates in a handle 36 in laterally outwardly spaced relationship to the longitudinal side edge 4. A plurality of lamination advancing legs 37, 38 and 39 are pivotally secured to the intermediate portion of the lever 33, and in overlying relationship one to another, by a vertically disposed common pivot pin 40 which is insertable through a selected one of a plurality of longitudinally spaced openings 41, depending on the width of the rafter X being constructed in my novel device. At their free ends the legs 37, 38 and 39 are provided with gripping feet 42 which are biased toward engagement, one each with one of the laminations Y by means of coil springs connecting their outer ends 43 and a depending anchoring pin 44 carried by the lever 33 in longitudinally outwardly spaced relationship to the axis 40.

As shown particularly in Fig. 6, the lowermost leg 39 has a circular opening 45 which snugly receives the pivot pin 40 and permits only pivotal movements of the leg 39 with respect thereto. The uppermost legs 37 and 38, however, are slotted generally longitudinally thereof, as indicated by the numeral 46 whereby to permit both pivotal movements of said legs 37 and 38 with respect to pivot pin 40 but also limited longitudinal movements thereof. Preferably and as shown the opposite of the slots 46 are provided with means which yieldingly bias the pivot pin toward the longitudinal centers of the slots 46, said means preferably being in the nature of displaceable rubber elements 47.

Closely adjacent to the material advancing mechanism, immediately above described, is a rafter hold down roller 48 which is pivotally journaled between a pair of arms 49 carried by a horizontally disposed shaft 50 which is telescopically received within a mounting tube 51. A conventional clamp 52 blocks the shaft 50 against rotary and longitudinal extending and retracting movements to compensate for widths and thicknesses of rafter X being passed thereunder.

By reference to Fig. 3 it will be noted that the guide 5 is interrupted immediately opposite the lamination engaging feet 42 of the legs 37, 38 and 39, as indicated by the numeral 53, and is therein provided with a pair of longitudinally spaced antifriction rollers 54 and 55 which are pivotally secured ot the table 1 on vertical axes.

As shown in Figs. 1 and 2, a pair of longitudinally spaced vertically journaled rollers 56 and 57 (rearwardly from the saw 13 with respect to the path of travel of the rafter X), are carried by a pair of arms 58 and 59 respectively which are, in turn, pivotally secured on vertical axes to the table 1, as indicated by the numeral 60. The pivots 60 are laterally disposed with respect to the path of travel of the rafter X and the rollers 56, 57 are biased toward positions to engage the side 61 of the rafter X and, in turn, bias said rafter X toward engagement with the guide 5, by means of coil compression springs 62 and 63 respectively interposed between the intermediate portions of the arms 58, 59 and laterally outwardly spaced upstanding stop plates 64 and 65 respectively. Inward swinging movements of the arms 58, 59 and the rollers 56, 57 respectively carried thereby is limited by means of laterally projecting headed stop pins 66 carried by the arms and slidable in plates 67.

In the practicing of my invention with the above described apparatus, boards or planks are cut longitudinally on the same arc at which the guide 5 has been set. The desired number of such arcuately cut planks are laid one upon another depending upon the thickness of the rafter X to be formed, each board becoming a lamination Y in said rafter X. Glue or other adhesive is placed between the abutting faces of the laminations Y by any suitable means, not shown, and the ends of the planks are arranged in staggered relationship, as shown in Fig. 3. Next the hold down roller 48 is placed in position and clamp 52 is tightened to retain the roller 48 in set position. Similar planks are laid in staggered position so that the abutting ends of each lamination Y is in tight engagement. While one operator advances the rafter X along the guideway 5 and table 1 by means of the leg equipped lever 33, another operator at predetermined spaced points depresses the treadle 32 and causes the compression bar 30 to tightly compress the laminations Y while nails are being driven therethrough by the element 26. The pivotal arrangement of the pivot pin 40 with respect to the legs 37, 38 and 39 above described assures uniform force being exerted against all of the laminations Y so as to positively preclude any gap between the adjacent ends of the several lamination segments 68 making up each lamination Y.

Any suitable signal 69 carried by the table 1 and actuated by an arm 70 and other well-known control means, not shown, whereby to light a light or the like may be used to inform the operator of the saw 13 when he should sever the laminations Y to create an end of a given rafter X.

My invention has been thoroughly tested and found to be completely satisfactory for the accomplishment of the above objects, and while I have disclosed a preferred embodiment thereof, it should be obvious that same is capable of modification without departure from the scope of the appended claims.

What I claim is:

1. A device for continuously forming elongated laminated rafters and the like from superimposed laminations comprising relatively short lengths of material in end to end abutting relationship, said device comprising an elongated horizontally disposed table, an elongated upstanding guide mounted on said table and extending generally longitudinally thereof, a lamination compressing and nailing device on said table intermediate the ends thereof, and rafter advancing means on said table in spaced relation to said lamination compressing and nailing device, said advancing means including a plurality of superimposed lamination engaging elements each movable relative to the others thereof and each engaging a separate lamination to impart independent advancing movements thereto toward said compressing and nailing device, whereby to maintain end to end abutting relationship between said lengths of material in each lamination.

2. A device for continuously forming elongated laminated rafters and the like from superimposed laminations comprising relatively short lengths of material in end to end abutting relationship, said device comprising, an elongated horizontally disposed table, an elongated upstanding flexible guide mounted on said table and extending generally longitudinally thereof, longitudinally spaced adjustable anchoring devices on said table for adjustably shifting said guide with respect to said table to impart longitudinally arcuate shape to said guide or to vary the arcuate shape thereof, a lamination compressing and nailing device on said table intermediate the ends thereof, and rafter advancing means on said table in spaced relation to said lamination compressing and nailing device, said advancing means including a plurality of superimposed lamination engaging elements each movable relative to the others thereof and each engaging a separate lamination to impart independent advancing movements thereto toward said compressing and nailing device and toward said guide, whereby to maintain superimposed relationship of said laminations and end to end abutting relationship between said lengths of material in each lamination.

3. The structure defined in claim 2 in which said table comprises a plurality of table sections in end to end relationship, and in further combination with hinge means securing said table sections together at a common longitudinal side edge of said table for adjustable pivotal movements relative to each other on vertical axes, whereby the arcuate shape of said guide may be further varied.

4. A device for continuously forming elongated laminated rafters and the like from superimposed laminations comprising relatively short lengths of material in end to end abutting relationship, said device comprising, an elongated horizontally disposed table, an elongated upstanding guide mounted on said table and extending generally longitudinally thereof, a lamination compressing and nailing device on said table intermediate the ends thereof, and rafter advancing means on said table in spaced relation to said lamination compressing and nailing device, said lamination advancing means comprising, a lever pivotally secured to one side of the table, said lever overlying the path of travel of said laminations on said table and terminating laterally outwardly from the opposite side of said table, a plurality of lamination advancing legs having lamination engaging feet, means pivotally mounting said legs to the intermediate portion of said lever on a common pivot and in overlying relationship one to another, and yielding means independently biasing each of said legs in a direction to cause engagement of the feet thereof each with a different one of said laminations.

5. The structure defined in claim 4 in which said means for mounting said legs to said lever comprises a pivot pin secured to said lever, the lowermost of said legs having a circular opening for reception of said pivot pin and permitting pivotal movements only of said lowermost leg with respect to said lever, said legs above the lowermost one thereof having slots elongated in a direction longitudinally of said legs for reception of said pivot pin and permitting pivotal and limited longitudinal movements of said upper legs, and in further combination with yielding means in opposite ends of said slots urging said pivot pin toward the longitudinal centers of said slots.

References Cited in the file of this patent

UNITED STATES PATENTS

| | | |
|---|---|---|
| 1,810,245 | Horton | June 16, 1931 |
| 2,399,348 | Hobbs | Apr. 30, 1946 |
| 2,662,564 | Poyzant | Dec. 15, 1953 |